United States Patent

[11] 3,609,154

| [72] | Inventors | Graham Alwyn Fothergill |
| | | Knebworth; |
| | | John Mervyn Osbond, The Ryde, Hatfield, |
| | | both of England |
| [21] | Appl. No. | 775,583 |
| [22] | Filed | Nov. 12, 1968 |
| [45] | Patented | Sept. 28, 1971 |
| [73] | Assignee | Hoffmann-La Roche, Inc. |
| | | Nutley, N.J. |
| [32] | Priority | Nov. 30, 1967 |
| [33] | | Great Britain |
| [31] | | 54477/67 |

[54] 2-(ARYLPROPYL)-1,2,3,4-TETRAHYDROISOQUINOLINES, INTERMEDIATES AND PROCESSES
12 Claims, No Drawings

[52] U.S. Cl. ................................................ 260/289 R,
260/240 K, 260/456 P, 260/612 D, 260/651 R,
428/258
[51] Int. Cl. .................................................. C07d 33/38

[50] Field of Search............................................. 260/289,
240 D, 289 R

[56] References Cited
UNITED STATES PATENTS
2,813,872  11/1957  Schmutz........................ 260/286
FOREIGN PATENTS
707,705   7/1941  Germany...................... 260/283
725,535  10/1942  Germany...................... 260/289
725,536  10/1942  Germany...................... 260/289
726,008  10/1942  Germany...................... 260/240
984,361   2/1965  Great Britian............... 260/283

*Primary Examiner*—John D. Randolph
*Attorneys*—Samuel L. Welt, Jon S. Saxe, Bernard S. Leon, William G. Isgro and George M. Gould ABSTRACT: 2-(Arylpropyl)-1,2,3,4-tetrahydroisoquinolines, prepared inter alia, by condensing the corresponding 1,2,3,4-tetrahydroisoquinolines and arylpropyl halides, are described. The end products are useful as analgesics and amoebicides.

2-(ARYLPROPYL)-1,2,3,4-TETRAHYDROISOQUINOLINES, INTERMEDIATES AND PROCESSES

BRIEF SUMMARY OF THE INVENTION

The invention relates to isoquinoline derivatives of the formula

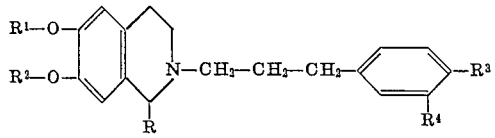

wherein R is hydrogen or lower alkyl; $R^1$ and $R^2$, individually, are lower alkyl and taken together are methylene; and $R^3$ and $R^4$, individually, are hydrogen or lower alkyl and taken together are trimethylene, tetramethylene or butadien-(1,3)-ylene-(1,4) and pharmaceutically acceptable acid addition salts thereof.

The compounds of formula I are useful as analgesics and amoebicides. In another aspect, the invention relates to novel intermediates and processes.

DETAILED DESCRIPTION OF THE INVENTION

The invention relates to isoquinoline derivatives of the formula

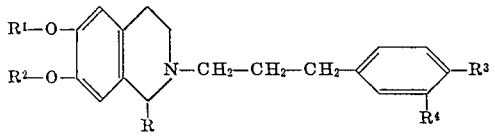

wherein R is hydrogen or lower alkyl; $R^1$ and $R^2$, individually, are lower alkyl and taken together are methylene; and $R^3$ and $R^4$, individually, are hydrogen or lower alkyl and taken together are trimethylene, tetramethylene or butadien-(1,3)-ylene-(1,4) and pharmaceutically acceptable acid addition salts thereof.

As used herein, the term "lower alkyl" denotes a straight or branched chain hydrocarbon group containing one to seven carbon atoms such as methyl, ethyl, propyl, isopropyl, butyl, tertiary butyl, pentyl, hexyl and the like. The term "halogen" denotes all the halogens, that is, bromine, chlorine, fluorine and iodine; chlorine and bromine are preferred. The term "aryl" denotes aromatic hydrocarbons of six to 12 carbon atoms such as phenyl, lower alkyl substituted phenyl, indanyl, naphthyl, 5,6,7,8-tetrahydronaphthyl and the like.

An interesting class of novel isoquinoline derivatives provided by the invention comprises those compounds of formula I wherein R is hydrogen, methyl or ethyl; $R^1$ and $R^2$ are methyl or taken together are methylene; and $R^3$ and $R^4$, individually, are hydrogen or methyl or taken together are trimethylene, tetramethylene or butadien-(1,3)-ylene-(1,4) and their pharmaceutically acceptable acid addition salts.

Exemplary of the compounds of the invention are:
6,7-dimethoxy-1-methyl-2-[3-(3,4-dimethylphenyl)propyl]-1,2,3,4-tetrahydroisoquinoline;
(+) 6,7-dimethoxy-1-methyl-2-[3-(3,4-dimethylphenyl)propyl]-1,2,3,4-tetrahydroisoquinoline;
(−) 6,7-dimethoxy-1-methyl-2-[3-(3,4-dimethylphenyl)propyl]-1,2,3,4-tetrahydroisoquinoline;
6,7-dimethoxy-1-methyl-1-2-(3-phenylpropyl)-1,2,3,4-tetrahydroisoquinoline;
6,77-dimethoxy-2[3-(3,4-dimethylphenyl)propyl]-1,2,3,4-tetrahydroisoquinoline;
6,7-dimethoxy-1-methyl-2-[3-(4-methylphenyl)propyl]-1,2,3,4-tetrahydroisoquinoline;
6,7-dimethoxy-1-methyl-2-[3-(4-isopropylphenyl)propyl]-1,2,3,4-tetrahydroisoquinoline;
6,7-dimethoxy-1-methyl-2-{3-[naphthyl-(2)]-propyl}-1,2,3,4-tetrahydroisoquinoline;
6,7-methylenedioxy-1-methyl-2-[3-(3,4-dimethylphenyl)propyl]-1,2,3,4-tetrahydroisoquinoline;
6,7-dimethoxy-1-methyl-2-{3-[5,6,7,8-tetrahydronaphthyl-(2)]-propyl}-1,2,3,4-tetrahydroisoquinoline;
6,7-dimethoxy-1-methyl-2-{3-[idanyl-(5)]-propyl}-1,2,3,4-tetrahydroisoquinoline;
6,7-dimethoxy-1-ethyl-2-[3-(3,4-dimethylphenyl)propyl]-1,2,3,4-tetrahydroisoquinoline; and the like.

Of these, the preferred is 1-methyl-2-[3-(3,4-dimethylphenyl)propyl]-6,7-dimethoxy-1,2,3,4-tetrahydroisoquinoline and its pharmaceutically acceptable acid addition salts. The isoquinolines of formula I of this invention can be prepared by the following methods:

According to one method, the novel isoquinoline derivatives of formula I are prepared by condensing a tetrahydroisoquinoline of the formula

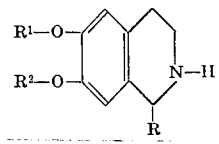

wherein R, $R^1$ and $R^2$ are as previously described with a compound of the formula

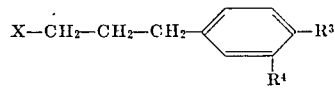

wherein $R^3$ and $R^4$ are as previously described and X is halogen, lower alkylsulfonyloxy or arylsulfonyloxy and, if desired, converting the condensation product into a pharmaceutically acceptable acid addition salt.

The tetrahydroisoquinoline starting materials of formula II are known substances and can be prepared according to conventional processes.

The starting materials of formula III can be prepared, for example, by reducing an acid of the formula

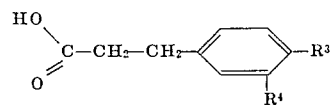

wherein $R^3$ and $R^4$ are as previously described or a lower alkyl ester thereof with an alkali metal aluminum hydride and replacing the hydroxyl group of the resulting alcohol with a halogen, a lower alkylsulfonyloxy or arylsulfonyloxy group. The reduction of the acid of formula IV or a lower alkyl ester thereof with an alkali metal aluminum hydride, preferably lithium aluminum hydride, can be carried out in an inert organic solvent such as diethyl ether or tetrahydrofuran at an elevated temperature, for example, the reflux temperature of the reduction medium. The replacement of the hydroxyl group in the alcohol reduction product by a halogen atom can be carried out using an appropriate thionyl halide, for example, thionyl chloride, an appropriate hydrogen halide, for example, hydrogen bromide, or an appropriate phosphorus trihalide, for example, phosphorus tribromide, in ether at reflux temperature. The replacement of the hydroxy group in the alcohol reduction product by a lower alkylsulfonyloxy or arylsulfonyloxy group can be carried out using an appropriate lower alkylsulfonyl or arylsulfonyl halide, for example, methanesulfonyl chloride or paratoluenesolfonyl chloride.

The condensation of the tetrahydroisoquinoline starting material of formula II with a halide starting material of formula III can be carried out using at least two molar proportions of the tetrahydroisoquinoline for each molar proportion of halide. However, for economic reasons, it is preferable to use equimolar proportions of the tetrahydroisoquinoline and halide and to carry out the condensation in the presence of sufficient acid-binding agent to take up the hydrogen halide which is liberated. Suitable acid-binding agents are alkali metal carbonates such as sodium carbonate, alkali metal bicarbonates such as sodium bicarbonate, or, preferably, tertiary organic amines such as triethylamine or pyridine. The condensation can be carried out at a temperature within the range of about 20° C. to about 30° C. in an organic solvent which is inert under the conditions of the condensation. A polar organic solvent is preferred.

One embodiment of the foregoing method which gives rise to an interesting class of products comprises condensing a tetrahydroisoquinoline starting material of formula II wherein R is hydrogen, methyl or ethyl and $R^1$ and $R^2$ are methyl or taken together are methylene with a compound of formula III wherein $R^3$ and $R^4$ are hydrogen or methyl or taken together are trimethylene, tetramethylene or butadien-(1,3)-ylene-(1,4) and X is chlorine or bromine. The preferred embodiment of the foregoing method comprises condensing 1-methyl-6,7-dimethoxy-1,2,3,4-tetrahydroisoquinoline with 3-(3,4-dimethylphenyl)-propyl bromide.

According to a second method, the novel isoquinoline derivatives of formula I are prepared by reducing an amide of the formula

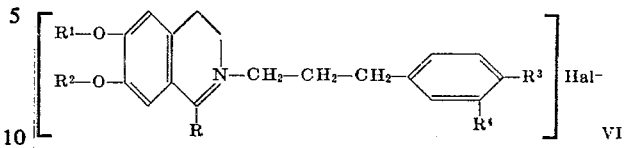

wherein R, $R^1$, $R^2$, $R^3$ and $R^4$ are as previously described with an alkali metal aluminum hydride and, if desired, converting the reduction product into a pharmaceutically acceptable acid addition salt.

The amide starting materials of formula V can be prepared, for example, by converting an acid of formula IV into the corresponding acid halide condensing the acid halide with a tetrahydroisoquinoline of formula II. The conversion of the acid of formula IV into an acid halide, preferably an acid chloride, can suitably be carried out using a thionyl halide, preferably thionyl chloride, in an inert organic solvent, for example, an aromatic hydrocarbon solvent such as benzene, at an elevated temperature, for example, at the reflux temperature of the mixture. The condensation of the resulting acid halide with a tetrahydroisoquinoline of formula II can be carried out using at least two molar proportions of the tetrahydroisoquinoline for each molar proportion of acid halide but, for economic reasons, it is preferable to use equimolar porportions of the tetrahydroisoquinoline and acid halide and to carry out the condensation in the presence of a sufficient amount of an acid-binding agent to take up the hydrogen halide which is liberated. Suitable acid-binding agents are tertiary organic amines such as triethylamine or pyridine. The condensation can be carried out in an inert organic solvent such as ethyl acetate at a temperature within the range of from about 20° C. to about 30° C. A class of amide starting materials of formula V which give rise to an interesting class of products is that wherein R is hydrogen, methyl or ethyl, $R^1$ and $R^2$ are methyl or taken together are methylene and $R^3$ and $R^4$ are hydrogen or methyl or taken together are trimethylene, tetramethylene or butadien-(1,3)-ylene-(1,4), particularly 1-methyl-2-[3-(3,4-dimethylphenyl)-propionyl]-6,7-dimethoxy-1,2,3,4-tetrahydroisoquinoline which gives rise to a preferred product.

The reduction of an amide starting material of formula V with an alkali metal aluminum hydride, preferably lithium aluminum hydride, can be carried out in an inert organic solvent such as tetrahydrofuran, dioxane, or diethyl ether. The reduction can be carried out at a temperature which is elevated above room temperature, preferably at the reflux temperature of the reduction medium.

According to a third method, the novel isoquinoline derivatives of formula I are prepared by reducing a quaternary salt of the formula.

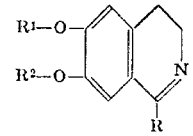

wherein R, $R^1$, $R^2$, $R^3$ and $R^4$ are as previously described and $Hal^1$ is a halogen anion either with an alkali metal borohydride or an alkali metal aluminum hydride or with hydrogen in the presence of a catalyst and, if desired, converting the reduction product into a pharmaceutically acceptable acid addition salt.

The quaternary salts of formula VI can be prepared for example, by quaternizing a dihydroisoquinoline of the general formula

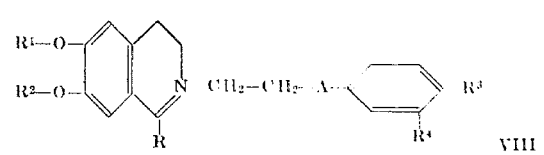

wherein R, $R^1$ and $R^2$ are as previously described with a halide of formula III. The quaternization can be carried out in a polar organic solvent, for example, a lower alkanol such as ethanol, at a temperature elevated above room temperature, for example, the reflux temperature of the quaternization mixture. A class of quaternary salts of formula VI which gives rise to an interesting class of products is that wherein R is hydrogen, methyl or ethyl, $R^1$ and $R^2$ are methyl or taken together are methylene, $R^3$ and $R^4$ are hydrogen or methyl or taken together are trimethylene, tetramethylene or butadien-(1,3)-ylene-(1,4) and $Hal^1$ a chloride or bromide anion, particularly 1-methyl-2-[3-(3,4-dimethylphenyl)-propyl]-6,7-dimethoxy-3,4-dihydroisoquinolinium bromide which gives rise to a preferred product.

The reduction of a quaternary salt of formula VI with an alkali metal borohydride such as sodium borohydride or potassium borohydride can be carried out in an inert organic solvent, for example, a lower alkanol such as ethanol, at a temperature within the range of from about 20° C. to about 30° C. The reduction of a quaternary salt of formula VI with an alkali metal aluminum hydride, preferably lithium aluminum hydride, can be carried out in an inert organic solvent, for example, diethyl ether, dioxane or tetrahydrofuran, at a temperature within the range of from about 20° C. to about 30° C. The reduction of the quaternary salt of formula VI with hydrogen in the presence of a catalyst can be carried out at room temperature and atmospheric pressure using a noble metal catalyst such as a palladium or platinum catalyst. A platinum catalyst is preferred. This reduction can suitably be carried out in a lower alkanol such as ethanol. In certain circumstances it may be possible and even desirable to carry out the reduction using an alkali metal borohydride or hydrogen in the presence of a catalyst without isolating the quaternary salt from the medium in which it is prepared.

According to a fourth method, the novel isoquinoline derivatives of formula I are prepared by catalytically hydrogenating an acid addition salt of a ketone or carbinol of the formula

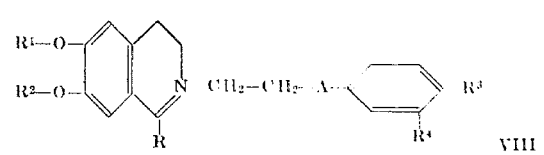

Wherein R, $R^1$, $R^2$, $R^3$ and $R^4$ are as previously described and A is carbonyl or hydroxy-methylene in the presence of a palladium catalyst and a strong acid and, if desired, converting the resulting product into a pharmaceutically acceptable acid addition salt.

The acid addition salts of the ketones and carbinols of formula VIII can be prepared, for example, by reacting a tetrahydroisoquinoline of formula II or an acid addition salt thereof with formaldehyde and a ketone of the general formula

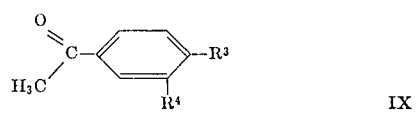

IX wherein $R^3$ and $R^4$ are as previously described by means a 6,7 reaction and, if desired, reducing the ketone the carbinol 1,2,3,4 catalytically or by treatment with an alkali metal aluminum hydride or alkali 1-tartaric borohydride and, where required, converting said ketone or carbinol as the case may be into an acid addition salt. A class of acid addition salts of the ketones and carbinols of formula VIII which gives rise to an interesting class of products is that in which R is hydrogen, methyl or ethyl, $R^1$ and $R^2$ are methyl or taken together are methylene and $R^3$ and $R^4$ are hydrogen or methyl or taken together are trimethylene, tetramethylene or butadien-(1,3)-ylene-1,4), particularly 1-methyl-2-[3-(3,4-dimethylphenyl) - 3-(hydroxy or iceto)-propyl]keto)-propyl]-6,7-dimethoxy-1,2,3,4-tetrahydroisoquinoline hydrochloride which gives rise to a preferred product.

The catalytic hydrogenation of an acid addition salt of a ketone or carbinol of formula VIII can be carried out in the presence of any strong acid, but is preferably carried out in the presence of hydrochloric acid or perchloric acid. The catalytic hydrogenation can be carried out in an inert organic solvent, for example, a lower alkanol such as methanol. Further, it can e carried out at room temperature and at atmospheric pressure, although higher or lower temperatures and/or pressures can be used, if desired.

According to a fifth method, the novel isoquinoline derivatives of formula I are prepared by catalytically hydrogenating an acetylenic or olefinic compound of the formula

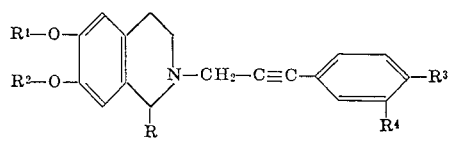

Xa or

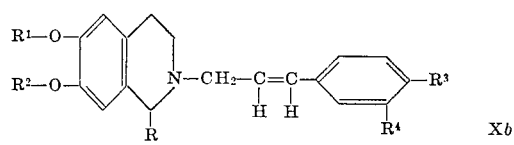

Xb respectively,
wherein R, $R^1$, $R^2$, $R^3$ and $R^4$ are as previously described or an acid addition salt thereof and, if desired, converting the product into a pharmaceutically acceptable acid addition salt.

The acetylenic compounds of formula Xa can be prepared, for example, by treating a substituted acetylene of the formula

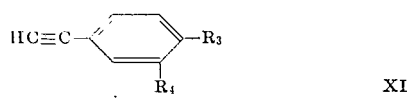

XI wherein $R^3$ and $R^4$ are as previously described with a (lower alkyl)-magnesium halide and formaldehyde, hydrolyzing the metal organic compound obtained, converting the resulting acetylenic alcohol of the formula

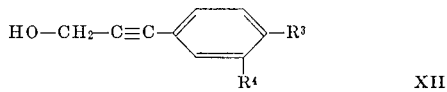

XII wherein $R^3$ and $R^4$ are as previously described into the corresponding bromide or chloride and condensing this chloride or bromide with a tetrahydroisoquinoline of formula II. The treatment of a substituted acetylene of formula XI with a (lower alkyl)-magnesium halide, preferably ethyl-magnesium bromide, and formaldehyde can be carried out under the usual conditions of a Grignard reaction. Thus, a substituted acetylene of formula XI can be added to the (lower alkyl)-magnesium halide in dry ether and formaldehyde gas can be introduced into the resulting mixture. The resulting metal organic compound can be hydrolyzed in a conventional manner; for example, by treatment with aqueous ammonium chloride solution. The conversion of the resulting acetylenic alcohol of formula XIII into a corresponding chloride or bromide can be carried out using phosphorus trichloride or phosphorus tribromide. This conversion is suitably carried out in an inert organic solvent, for example, an ether such as diethyl ether, and a tertiary organic base such as pyridine at a temperature below room temperature, for example, 0° C. The condensation of the so-obtained chloride or bromide with the tetrahydroisoquinoline of formula II can be carried out using at least two molar proportions of the tetrahydroisoquinoline for each molar proportion of the chloride or bromide. However, for economic reasons, it is preferred to use equimolar proportions of the tetrahydroisoquinoline and the chloride or bromide and to carry out the condensation in the presence of sufficient acid-binding agent to take up the hydrogen chloride or hydrogen bromide which is liberated. The preferred acid-binding agents are tertiary organic amines such as triethylamine and pyridine. The condensation can suitably be carried out at a temperature within the range of from about 20° C. to about 30° C. in an organic solvent which is inert under the conditions of the condensation, for example, acetone.

The ethylene compounds of formula Xb can exist in a cis or trans form and can be prepared, for example, by condensing a halide of the formula

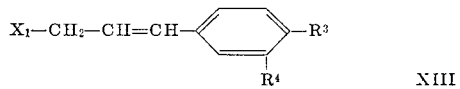

XIII wherein $R^3$ and $R^4$ are as previously described and $X^1$ is chlorine or bromine with a tetrahydroisoquinoline of formula II. This condensation can conveniently be carried out in the same manner as that described earlier in connection with the preparation of the acetylenic compounds of formula Xa. Alternatively, the cis ethylenic compounds of formula Xb can be prepared by catalytically hydrogenating an acetylenic compound of formula Xa in the presence of a partially deactivated palladium catalyst. Suitable palladium catalysts are those which have been partially deactivated with lead, bismuth, copper, zinc, tin, mercury, cadmium or thorium. A preferred catalyst is one which has been partially deactivated with lead with the addition of quinoline. This catalytic hydrogenation can suitably be carried out in an inert organic solvent, for example, a lower alkanol such as methanol, at room temperature and atmospheric pressure.

A class of acetylenic and olefinic compounds of formulas Xa and Xb, respectively, which gives rise to a preferred class of products is that wherein R is hydrogen, methyl or ethyl, $R^1$ and $R^2$ are methyl or taken together are methylene and $R^3$ and $R^4$ are hydrogen or methyl or taken together are trimethylene, tetramethylene or butadien-(1,3)-ylene-(1,4), particularly 1-methyl-2-[3,(3,4-dimethylphenyl)-propyn-(2)-yl]-6,7- dimethoxy-1,2,3,4-tetrahydroisoquinoline and 1-methyl-2-[3-(3,4-dimethylphenyl)-allyl]-6,7-dimethoxy-1,2,3,4-tetrahydroisoquinoline which give rise to a preferred product.

The catalytic hydrogenation of an acetylenic or olefinic compound of formulas Xa or Xb, respectively, or an acid addition salt thereof to build the novel isoquinoline derivatives of formula I can suitably be carried out using platinum oxide or palladium as the catalyst although other catalysts such as Raney nickel may also be used. The catalytic hydrogenation can suitably be carried out in the presence of an inert organic solvent, for example, a lower alkanol such as methanol, at room temperature and atmospheric pressure, although it can be carried out at higher or lower temperatures and/or pressures, if desired. It will be appreciated that it may be possible, and even desirable, to carry out the catalytic hydrogenation without isolating the acetylenic or olefinic starting material from the medium in which it is prepared.

It will be appreciated that the compounds of formula I wherein R is lower alkyl contain an asymmetric carbon atom and occur as stereoisomeric racemate. The racemate can, if desired, be separated into its optical isomers in accordance with known procedures, for example, by fractional crystallization of its salts. Also, those starting materials of formulas II, V, VIII, Xa and Xb wherein R is lower alkyl can be separated in to their optical isomers and these isomers can be used in accordance with the appropriate process hereinbefore described to yield directly the desired isomer of a compound of formula I.

The compounds of formula I are viscous oils which have basic properties. They can be converted into pharmaceutically acceptable acid addition salts with inorganic acids such as hydrochloric acid, hydrobromic acid, sulfuric acid, phosphoric acid and the like or with organic acids such as acetic acid, tartaric acid, maleic acid, fumaric acid, citric acid, oxalic acid and toluene-sulfonic acid and the like. These salts are crystalline solids, soluble in water and in solvents such as methanol and ethanol and relatively insoluble in nonpolar solvents such as benzene and ether.

The novel isoquinoline derivative of formula I have analgesic activity and are useful as analgesic agents. Their useful analgesic activity is demonstrated in warmblooded animals utilizing standard procedures such as, for example, the writhing test described by Parkes and Pickens, Brit. J. Pharmacol., 1965, 25, 81, in which analgesic activity is expressed as $PD_{50}$ which is calculated from the number of writhes induced by phenylbenzoquinone between control groups of test animals and groups of test animals treated with the particular derivative under investigation.

6,7-Dimethoxy-1-methyl-2-[3-(4-methylphenyl)-propyl]-1,2,3,4-tetrahydroisoquinoline hydrochloride, which has demonstrated an $LD_{50}$ of 400 mg./kg. p.o. in mice, exhibits in the writhing test a $PD_{50}$ in mice of 25 mg./kg. Again, for example, 6,7-dimethoxy-1-methyl-2-{-3-[5,6,7,8-tetrahydronaphthyl-(2)]-propyl}-1,2,3,4-tetrahydroisoquinoline hydrochloride which has demonstrated an $LD_{50}$ of 400 mg./kg. p.o. in mice, exhibits analgesic activity in the writhing test in mice with an oral $PD_{50}$ of 25 mg./kg.

The present novel derivatives of formula I have analgesic effects qualitatively similar to those of codeine and their activity permits their use in the same general manner as codeine which, in the writhing test, exhibits at an oral dose a $PD_{50}$ of 52 mg./kg.

The novel isoquinoline derivatives of formula I also have amoebicidal activity and are useful as amoebicidal agents. For example, 6,7-dimethoxy-1-methyl-2-[3-(3,4-dimethylphenyl)-propyl]-3, 1,2,3,4-tetrahydroisoquinoline hydrochloride, which in mice has demonstrated an $LD_{50}$ of 310 mg./kg. p.o. exhibits amoebicidal activity in rats and in hamsters. In rats, 50 percent of amoebae were cleared from the caecum ($CD_{50}$) on administration of a single oral dose of 15 mg./kg. or a single subcutaneous dose of 7 mg./kg. In hamsters, a single subcutaneous dose of 1 mg./kg. cleared 50 percent of the amoebae form the caecum. The amoebicidal test used was a modification of that described by W. R. Jones, Ann Trop. Med. Parasitol., 1946, 40, 130, and involves the estimation of amoebae remaining in the caecum of two groups of rats, that is, a control group and a group treated with the particular derivative under investigation. The present derivatives have amoebicidal effects qualitatively similar to those of dehydroemetine. Their activity as herein indicated permits use in the same general manner as dehydro-emetine which exhibits amoebicidal activity with a $CD_{50}$ of 5 mg./kg. p.o. in rats. The novel derivatives of formula I can thus be used for the treatment of intestinal amoebiasis.

The isoquinoline derivatives of formula I may be used as medicaments in the form of pharmaceutical preparations which contain them in association with a compatible pharmaceutical carrier. The pharmaceutical preparations may be made up for enteral, for example, oral, or parenteral administration. Solid preparations for oral administration include tablets, pills, powders, capsules and granules. Suitable carriers include inorganic substances, for example, talc and the like, or organic substances, for example, lactose, starch and the like. Additives such as magnesium stearate (a lubricant) may also be present. Liquid preparations for oral administration include emulsions, solutions and suspensions. Diluents which are commonly used in pharmacy, for example, water and the like, may be incorporated into such preparations. The liquid preparations may take the form of sterile aqueous or nonaqueous solutions, suspensions or emulsions. Polyoxyethyleneglycols and vegetable oils may be useful as suspending media. Emulsifying agents, dispersing agents and other adjuvants may also be present. The pharmaceutical preparations may be submitted to the usual pharmaceutical operations and other therapeutically valuable materials may also be present therein.

The following nonlimiting examples further illustrate the invention. All temperatures are in degrees centigrade, unless otherwise mentioned.

EXAMPLE 1

A. Preparation of 3-(3,4-dimethyl-phenyl) propyl bromide

A solution containing 103.0 g. of ethyl 3-(3,4-dimethylphenyl)-propionate in 300 ml. of dry ether was added dropwise to a stirred suspension containing 19 g. of lithium aluminum hydride in 400 ml. of dry ether at such a rate as to maintain gentle reflux. The resulting mixture was heated at reflux for 1 hour, then cooled in ice. Fifty ml. of ethyl acetate were added to decompose the excess lithium aluminum hydride. Dilute sulfuric acid was then added. The resulting mixture was filtered through diatomaceous earth. The layers were separated. The aqueous layer was extracted twice with ether. The combined organic solutions were washed with water and brine, dried over anhydrous sodium sulfate and evaporated under reduced pressure. The residual colorless oil was distilled to yield 75.7 g. of 3(3,4dimethyl-phenyl)propanol, having a boiling point of 100°–104° C./0.6 mm.

Twenty-eight g. (9.83 ml.) of phosphorus tribromide were added over a period of 0.25 hour to a stirred solution containing 41.0 g. of 3-(3,4-dimethyl-phenyl)propanol in 50 ml. of dry ether and 4 ml. of pyridine cooled in ice/salt. The resulting mixture was heated at reflux for 3 hours, poured onto water and extracted three times with ether. The combined extracts were washed successively with dilute sodium carbonate solution and water and brine, dried over anhydrous sodium sulfate, filtered and evaporated under reduced pressure. The residual oil was distilled to yield 41.5 g. of 3-(3,4-dimethylphenyl)-propyl bromide as a colorless oil having a boiling point of 108°–110° C./1.5 mm.

B. Preparation of 6,77-dimethaxy-1-methyl-2-[3-(3,4-dimethyl-phenyl)propyl]-1,2,3,4-tetrahydroisoquinoline hydrochloride 5.7 g. of 3-(3,4-dimethyl-phenyl)propyl bromide were added in a single portion to a solution containing 5.2 g. of 6,7-dimethoxy-1-methyl-1,2,3,4-tetrahydro-isoquinoline and 2.5 g. of triethyl amine in 25 ml. of acetone. The resulting mixture was allowed to stand at room temperature for 3 days, during which time crystals of triethyl amine hydrobromide were deposited. The crystals were subsequently filtered off and the filtrate was evaporated to dryness. The residue was made basic with dilute sodium hydroxide solution and extracted twice with ether. The combined ethereal extracts were washed with water and brine, dried over anhydrous sodium sulfate and evaporated. To remove unreacted 6,7-dimethoxy-1-methyl-1,2,3,4-tetrahydro-isoquinoline starting materials, the residual oil was chromatographed on alumina using benzene as the eluant. The eluate was evaporated to dryness to give a pale yellow oil. An ethanolic solution of this material was treated with ethanolic hydrochloric acid and the resulting precipitate was recrystallized from isopropanol to yield 4.4 g. of 6,7-dimethoxy-1-methyl-2-[3-(3,4dimethyl-phenyl)-propyl]-1,2,3,4-tetrahydro-isoquinoline hydrochloride as white prisms having a melting point of 172°–174°.

EXAMPLE 2

A. Preparation of 3-(3,4-dimethyl-phenyl)-propyl bromide i. 6,7-Dimethoxy-1-methyl-1,2,3,4-tetrahydro-isoquinoline was resolved into its optical antipodes using d-tartaric acid and l-tartaric acid as described by SPATH and DENGEL in Ber., 1938, 71, 113.

ii. 3-(3,4-Dimethyl-phenyl)-propyl bromide was prepared as described in Example 1A.

B. Preparation of (+) 6,7-dimethoxy-1-methyl-2-[3-(3,4-dimethyl-phenyl)-propyl]-1,2,3,4-tetrahydro-isoquinoline hydrochloride A mixture containing 2.07 g. of (−) 6,7-dimethoxy-1-methyl-1,2,3,4-tetrahydro-isoquinoline, 2.0 g. of triethyl amine and 2.27 g. of 3-(3,4-dimethyl-phenyl)-propyl bromide in 20 ml. of N,N-dimethylformamide was heated under reflux for 2 hours, allowed to cool overnight and subsequently poured into 200 ml. of water. The resulting mixture was basified with dilute sodium hydroxide solution and extracted twice with ethyl acetate. The combined extracts washed with water and brine, dried over anhydrous sodium 1,2,3,4and evaporated under reduced pressure. To remove a small amount of unreacted (−) 6,7-dimethoxy-1-methyl-1, 2, 3, 4-tetrahydro-isoquinoline, the residual pale yellow oil was dissolved in benzene and chromatographed on a column of activated alumina using benzene as the eluant. The eluates were evaporated to give a colorless oil. An ethanolic solution of this oil was treated with ethanolic hydrogen chloride, then ether was added. The resulting precipitate was recystallized from ethanol to yield 2.0 g. of (−) 6,7-dimethoxy-1-methyl-2-[3-(3,4-dimethyl-phenyl)-propyl]-1,2,3,4-tetrahydro-isoquinoline hydrochloride as white crystals having a melting point of 189°–190°; $[\alpha]_{365m\mu}^{20°} = +111.9°$ ($c=0.5$ in ethanol).

EXAMPLE 3

A. Preparation of 3-(3, 4-dimethyl-phenyl)-propyl bromide i. 6, 7-Dimethoxy-1-methyl-1, 2, 3, 4-tetrahydro-isoquinoline was resolved into its optical antipodes using d-tartaric acid and l-tartaric acid as described by SPATH and DENGEL in Ber., 1938, 71, 113.

ii. 3-(3,4-Dimethyl-phenyl)-propyl bromide was prepared as described in Example 1A.

B. Preparation of (−) 6,7-dimethoxy-1-methyl-1-2-[3-(3,4-dimethyl-phenyl-propyl]-1,2,3,4-tetrahydro-isoquinoline hydrochloride A mixture containing 5.3 g. of (+) 6,7-dimethoxy-1-methyl-1,2,3,4-tetrahydro-isoquinoline, 5.1 g. of triethyl amine and 5.8 g. of 3-(3,4-dimethyl-phenyl)-propyl bromide in 70 ml. of N, N-dimethylformamide was heated under reflux for 2 hours, allowed to cool overnight and subsequently worked up in the manner described in example 2B. 4.4 g. of (−) 6,7-dimethoxy-1-methyl-2-[3-(3,4-dimethyl-phenyl)-propyl]-1,2,3,4tetrahydro-isoquinoline hydrochloride were obtained as a white crystalline solid having a melting point of 189°–190° (from ethanol); $[\alpha]_{365m\mu}^{20°}$ +−112° ($c=0.5$ in ethanol).

EXAMPLE 4

A. Preparation of 3-phenyl-propyl bromide

A mixture containing 100 g. of 3-phenyl-propanol and 330 g. of 48 percent aqueous hydrobromic acid was heated under reflux for 8 hours, cooled, diluted with water and extracted twice with ether. The combined ethereal extracts were washed with sodium carbonate solution, dried over anhydrous sodium sulfate and distilled to yield 130.8 g. of 3-phenyl-propyl bromide as a colorless oil having a boiling point of 120°/20 mm.

B. Preparation of 6,7-dimethoxy-1-methyl-2-(3-phenyl-propyl)- 1,2,3,4-tetrahydro-isquinoline hydrochloride 4.0 g. of 3-phenyl-propyl bromide were added in a single portion at room temperature to a solution containing 4.14 g. of 6,7-dimethoxy-1-methyl-1,2,3,4-tetrahydro-isoquinoline and 2.02 g. of triethyl amine in 20 ml. of acetone. The resulting mixture was allowed to stand at room temperature for 3 days, during which time crystals of triethyl amine hydrobromide were deposited. The acetone was subsequently removed by evaporation, and the residue was partitioned between dilute sodium hydroxide solution and ether. The layers were separated. The aqueous alkaline solution was extracted with ether and the combined ethereal solutions were washed with water and brine, dried over anhydrous sodium sulfate and evaporated. The residual pale yellow oil was chromatographed on alumina using benzene as the eluant. The eluate was evaporated to dryness and the residual colorless oil was dissolved in ethanol. Ethanolic hydrochloric acid was added to the resulting solution and the precipitate was recrystallized from isopropanol to yield 4.6 g. of 6,7-dimethoxy-1-methyl-2-(3-phenyl-propyl) -1,2,3,4-tetrahydro-isoquinoline hydrochloride as white prisms having a melting point of 181°–182°.

EXAMPLE 5

A. Preparation of 6,7-dimethoxy-1-methyl-2-[3-(3, 4-dimethyl-phenyl)-propionyl]-1,2,3,4-tetrahydro-isoquinoline Fifteen ml. of redistilled thionyl chloride were added at 20° to a solution containing 15 g. of 3-(3,4-dimethyl-phenyl)-propionic acid in 15 ml. of dry benzene. The resulting mixture was heated under reflux for 3 hours, then cooled to room temperature. The benzene and excess thionyl chloride were removed by evaporation under reduced pressure and the residual oil was distilled to yield 15.2 g. of 3-(3,4-dimethylphenyl)-propionyl chloride having a boiling point of 95°11 mm.

A solution containing 22.0 g. of 3-(3,4-dimethyl-phenyl)-propionyl chloride in 50 ml. of dry ethyl acetate was added over a period of 0.25 hour at 20° to a stirred solution containing 23.0 g. of 6,7-dimethoxy-1-methyl-1,2,3,4-tetrahydro-isoquinoline and 11.0 g. of triethyl amine in 150 ml. of dry ethyl acetate. A white precipitate of triethyl amine hydrochloride was immediately deposited. After the resulting mixture had been stirred for a further 3 hours, the precipitate was removed by filtration and washed with ethyl acetate. The combined filtrate and washings were washed successively with 2-N hydrochloric acid and water and brine, dried over anhydrous sodium sulfate, filtered and evaporated under reduced pressure. The residual viscous oil (38.5 g.) was distilled to give 6,7-dimethoxy-1-methyl-2-[3-3,4-dimethylphenyl)-propionyl]-1,2,3,4-tetrahydro-isoquinoline having a boiling point of 220°110$^{14}$ mm., solidifying as an amber glass.

B. Preparation of 6,7-dimethoxy-1-methyl-2-[3-(3,4-dimethyl-phenyl)-propyl]1,2,3,4-tetrahydro-isoquinoline hydrochloride A solution containing 22 g. of 6,7-dimethoxy-1-methyl-2-[3-(3,4-dimethyl-phenyl)-proionyl]-1,2,3,4-tetrahydro-isoquinoline in 100 ml. of dry tetrahydrofuran was added dropwise over a period of 0.5 hour under nitrogen at 0° to a stirred suspension containing 2.2 g. of lithium aluminum hydride in a mixture of 50 ml. of dry ether and 50 ml. of dry tetrahydrofuran. The resulting mixture was heated under reflux with stirring for 24 hours. After cooling to 0°, the excess lithium aluminum hydride was decomposed by the careful addition of ethyl acetate and the complex was decomposed by the addition of dilute sulfuric acid. The layers were separated - (3,4the organic layer was extracted once with dilute sulfuric acid. The combined aqueous acidic solutions were washed with ether, made basic with dilute sodium hydroxide solution and extracted twice with either. The combined ethereal extracts were washed with water and brine, dried over anhydrous sodium sulfate and evaporated under reduced pressure. The residual yellow oil was dissolved in dry ethanol. Ethanolic hydrogen chloride was added to the solution and the resulting precipitate was recrystallized from isopropanol to yield 10.3 g. of 6,7-dimethoxy-1-methyl-2-[3-(3,4-dimethyl-phenyl)-propyl]-1,2,3,4-tetrahydroisoquinoline hydrochloride as white prisms having a melting point of 170°–172°.

EXAMPLE 6

A. Preparation of 6,7-dimethoxy-2-[3,4-dimethyl-phenyl)-proionyl]-1,2,3,4-tetrahydro-isoquinoline A solution containing 16.3 g. of 3-(3,4-dimethyl-phenyl)-propionyl chloride (prepared as described in the first paragraph of Example 5A) in 100 ml. of dry ethyl acetate was added dropwise at room temperature over a period of 0.25 hour to a stirred solution containing 16.0 g. of 6,7-dimethoxy-1,2,3,4-tetrahydro-isoquinoline and 8.4 g. of triethyl amine in 150 ml. of dry ethyl acetate. The resulting mixture was stirred further for a period of 3 hours, then the precipitated triethyl amine hydrochloride was removed by filtration and washed with ethyl acetate. The combined filtrate and washings were washed successively with dilute hydrochloric acid and water and brine, dried over anhydrous sodium sulfate, filtered and evaporated. The residual viscous oil (26.5 g.) was distilled at 400°/10a$^{12.8}$ mm. to give 6,7-dimethoxy-2-[3-(3,4-dimethyl-phenyl-pripionyl]-1,2,3,4-tetrahydro-isoquinoline solidifying as an amber glass.

B. Preparation of 6,7-dimethoxy-2-[3-(3,4-dimethyl-phenyl-propyl]-1,2,3,4-tetrahydro-isoquinoline hydrochloride A solution containing 18.5 g. of 6,7-dimethoxy-2-[3-(3,4-dimethyl-phenyl)-propionyl]-1,2,3,4-tetrahydro-isoquinoline in 100 ml. of dry tetrahydrofuran was added dropwise at 0° over a period of 0.5 hour to a stirred suspension containing 1.9 g. of lithium aluminum hydride in a mixture of 50 ml. of ether and 50 ml. of tetrahydrofuran. The resulting mixture was heated under reflux for 24 hours, then cooled in ice. Excess lithium aluminum hydride and the complex were then decomposed by the successive careful addition of ethyl acetate and dilute sulfuric acid. The layers were then separated and the organic layer was extracted with dilute sulfuric acid. The combined aqueous acidic solutions were washed once with ether, made basic with dilute sodium hydroxide solution and extracted twice with ether. The combined ethereal extracts were washed with water and brine, dried over anhydrous sodium sulfate and evaporated under reduced pressure. The residual pale yellow oil was dissolved in ethanol. Ethanolic hydrogen chloride was added to the solution and the resulting precipitate was recrystallized from ethanol to yield 12.3 g. of 6,7-dimethoxy-2-[3-(3,4-dimethyl-phenyl)-propyl]-1,2,3,4-tetrahydro-isoquinoline hydrochloride as white prisms having a melting point of 216°–219°.

EXAMPLE 7

Preparation of 6,7-dimethoxy-1-methyl-2-(3-phenyl-propyl)-1,2,3,4-tetrahydro-isoquinoline hydrochloride 6,7-Dimethoxy-1-methyl-2-(3-phenyl-propyl)-1,2,3,4-tetrahydro-isoquinoline hydrochloride having a melting point of 177°–179° was obtained from 6,7-dimethoxy-1-methyl-2-(3-phenyl-propionyl)-1,2,3,4-tetrahydro-isoquinoline in accordance with either of examples 5B and 6B.

EXAMPLE 8

Preparation of 6,7dimethoxy-1-methyl-2-[3-(4-methyl-phenyl)-propyl]1,2,3,4-tetrahydro-isoquinoline hydrochloride 6,7-Dimethoxy-1-methyl-2-[3-(4-methyl-phenyl)-propyl]1,2,3,4-tetrahydro-isoquinoline hydrochloride having a melting point of 189°–190° was obtained from 6,7-dimethoxy-1-methyl-2-[3-(4-methyl-phenyl)-propionyl]-1,2,3,4-tetrahydro-isoquinoline in accordance with either of examples 5B and 6B.

EXAMPLE 9

Preparation of 6,7-dimethoxy-1-methyl-2-[3-(4-isopropyl-phenyl)-propyl]1,2,3,4-tetrahydro-isoquinoline hydrochloride 6,7-Dimethoxy-1-methyl-2-[3-(4-isopropyl-phenyl)-propyl]1,2,3,4-tetrahydro-isoquinoline hydrochloride having a melting point of 146°–148° was obtained from 6,7-dimethoxy-1-methyl-2-[3-(4-isopropyl-phenyl)-propionyl]-1,2,3,4-tetrahydro-isoquinoline in accordance with either of examples 5B and 6B.

EXAMPLE 10

Preparation of 6,7-dimethoxy-1-methyl-2-{3-[naphthyl-(2)]-propyl}-1,2,3,4-tetrahydro-isoquinoline hydrochloride 6,7-Dimethoxy-1-methyl-2- 3-[naphthyl-(2)]-propyl -1,2,3,4-tetrahydro-isoquinoline hydrochloride having a melting point of 174°–175° was obtained from 6,7-dimethoxy-1-methyl-2-{3-[naphthyl-(2)]-propionyl}-1,2,3,4-tetrahydro-isoquinoline in accordance with either examples 5B and 6B.

EXAMPLE 11

Preparation of 6,7-methylenedioxy-1-methyl-2-[3-(3,4-dimethyl-phenyl)-propyl]-1,2,3,4-tetrahydro-isoquinoline hydrochloride 6,7-Methylenedioxy- 1-methyl- 2-[3-(3,4-dimethyl-phenyl)-propyl]-1,2,3,4-tetrahydro-isoquinoline hydrochloride having a melting point of 200°–202° was obtained from 6,7-methylenedioxy-1-methyl-2-[3-(3,4-dimethyl-phenyl)-propionyl]-1,2,3,4-tetra-hydro-isoquinoline in accordance with either of examples 5B and 6B.

EXAMPLE 12

Preparation of 6,7-dimethoxy- 1-methyl- 2-{3-[5,6,7,8-tetrahydro-naphthyl-(2)]-propyl}-1,2,3,4 -tetrahydro-isoquinoline hydrochloride 6,7-Dimethoxy-1-methyl-2-{3-[5,6,7,8-tetrahydro-naphthyl-(2)]-propyl -1,2,3,4-tetrahydro-isoquinoline hydrochloride having a melting point of 150°–151° was obtained from 6,7-dimethoxy-1-methyl-2-{3-[5,6,7,8-tetrahydro-naphthyl (2)]-propionyl -1,2,3,4-tetrahydro-isoquinoline in accordance with either of examples 5B and 6B.

EXAMPLE 13

Preparation of 6,7-dimethoxy-1-methyl-2-{3-[indanyl-(5)]-propyl}-1,2,3,4-tetrahydro-isoquinoline hydrochloride having a melting point of 166°–167° was obtained from 6,7-dimethoxy-1-methyl-2-{3-[indanyl-(5)]-propionyl}-1,2,3,4-tetrahydro-isoquinoline in accordance with either of examples 5B and 6B.

EXAMPLE 14

A. Preparation of 6,7 -dimethoxy-1-methyl-2-[3-(3,4-dimethyl-phenyl)-propyl]-3,4-dihydro-isoquinolinium bromide A solution containing 4.0 g. of 3-(3,4-dimethyl-phenyl)-propyl bromide (prepared as described in example 1A) and 3.6 g. of 6,7-dimethoxy-1-methyl-3,4-dihydro-isoquinoline in 20 ml. of ethanol was heated under reflux for 8 hours. The solvent was subsequently removed by evaporation and the residual red oil was triturated with ether. The ether was removed by decantation and the residue was dissolved in warm acetone. The crystals which were deposited on scratching were removed by filtration and recrystallized twice from isopropanol to yield 6,7-dimethoxy-1-methyl-2-[3-(3,4-dimethyl-phenyl)-propyl]-3,4-dihydro-isoquinolinium bromide as a pale yellow crystalline solid having a melting point of 169°.

B. Preparation of 6,7-dimethoxy-1-methyl-2-[3-((3,4-dimethyl-phenyl)-propyl]-1,2,3,4-tetrahydro-isoquinoline hydrochloride 1 g. of sodium borohydride was added to a solution containing 6,7-dimethoxy-1-methyl-2-[3-(3,4-dimehtyl-phenyl)-propyl]-3,4-dihydro-isoquinolinium bromide obtained as described in part A of this example in about 40 ml. of ethanol. The resulting mixture was stirred at room temperature for 3 hours, then made basic with dilute sodium hydroxide solution. The ethanol was removed by filtration under reduced pressure and the residual aqueous mixture was diluted with water and extracted three times with ether The combined extracts were washed with water and brine, dried over anhydrous sodium sulfate and evaporated. The pale yellow oily residue was chromatographed on activated alumina using benzene as the eluant and the eluate was evaporated. An ethanolic solution of the residual colorless oil was treated with ethanolic hydrogen chloride and the resulting precipitate was recrystallized from isopropanol to give 6,7-dimethoxy-1-methyl-2-[3-(3,4-dimethyl-phenyl)-propyl]-1,2,3,4-tetrahydro-isoquinoline hydrochloride as white prisms having a melting point of 170°-172°.

Alternatively, 6,7-dimethoxy-1-methyl-2-[3-(3,4-dimethyl-phenyl)-propyl]-1,2,3,4-tetrahydro-isoquinoline can be obtained from 3-(3,4-dimethyl-phenyl)-propyl bromide and 6,7-dimethoxy-1-methyl-3,4-dihydro-isoquinoline without isolation of 6,7-dimethoxy-1-methyl-2-[3-(3,4-dimethyl-phenyl)-propyl]-3,4-dihydro-isoquinolinium bromide as follows:

A solution containing 4.0 g. of 3-(3,4-dimethyl-phenyl)-propyl bromide (prepared as described in example 1A) and 3.6 g. of 6,7-dimethoxy-1-methyl-3,4-dihydro-isoquinoline in 20 ml. of ethanol was heated at reflux for 8 hours. One g. of sodium borohydride and 20 ml. of ethanol were added to the resulting solution of crude 6,7-dimethoxy-1-methyl-2-[3-(3,4-dimethyl-phenyl)-propyl]-3,4-dihydro-isoquinolinium bromide and the resulting mixture was stirred at room temperature for 3 hours. After basification with dilute sodium hydroxide solution and evaporation of the ethanol under reduced pressure. the residual aqueous mixture was worked up as described earlier in part B of this example to yield 3.8 g. of 6,7-dimethoxy-1-methyl-2- 3-(3,4-dimethyl-phenyl)-propyl]1,2,3,4-tetrahydro-isoquinoline hydrochloride having a melting point of 170°-172°

EXAMPLE 15

Preparation of 6,7-dimethoxy-1-ethyl-2-[3-(3,4-dimethyl-phenyl)-propyl]-1,2,3,4-tetrahydro-isoquinoline hydrochloride A solution containing 9.08 g. of 3-(3,4-dimethyl-phenyl)-propyl bromide (prepared as described in example 1A) and 8.76 g. of 6,7-dimethoxy-1-ethyl-3,4-dihydro-isoquinoline in 30 ml of ethanol was heated under reflux with stirring for 8 hours and then cooled. Two g of sodium borohydride were added in divided portions over a period of 20 minutes to the resulting mixture. Twenty ml. of ethanol were then added and the mixture was stirred at room temperature for 3 hours. The ethanol was subsequently removed by evaporation under reduced pressure and the residue was made basic with dilute sodium hydroxide solution and extracted three times with ether The combined extracts were washed with water and brine, dried over anhydrous sodium sulfate and evaporated. The residual pale yellow oil was chromatographed on activated alumina using benzene as the eluant and the eluate was evaporated. An ethanolic solution of the residual colorless oil was treated with ethanolic hydrochloric acid and the resulting crystalline precipitate was recrystallized from ethanol/ether to yield 3.0 g. of 6,7-dimethoxy-1-ethyl-2-[3-(3,4-dimethyl-phenyl)-propyl]-1,2,3,4-tetrahydro-isoquinoline hydrochloride as white crystals having a melting point of 139°.

EXAMPLE 16

Preparation of 6,7-dimethoxy-1-methyl-2-[3-(3,4-dimethyl-phenyl)-propyl]-1,2,3,4-tetrahydro-isoquinoline hydrochloride To a solution containing 202.0 g. of 6,7-dimethoxy-1-methyl-2-[3-(3,4-dimethyl-phenyl)-3-keto-propyl]-1,2,3,4-tetra-hydro-isoquinoline hydrochloride in 2,000 ml. of methanol, maintained under an atmosphere of nitrogen, there were added 20 ml. of 72 percent perchloric acid followed by a slurry containing 40 g. of 5 percent palladium-on-carbon in 80 ml. of water. The resulting mixture was hydrogenated until 1 mol of hydrogen had been absorbed (7 hours). The catalyst was subsequently removed by filtration and the filtrate was evaporated under reduced pressure to a volume of about 600 ml. The residue was then diluted with water, made basic with sodium hydroxide solution and extracted three times with chloroform. The combined extracts were washed with water, dried over anhydrous sodium sulfate and evaporated under reduced pressure. The residual oily base (170 g.) was converted into the hydrochloride and this was recrystallized twice from water to yield 6,7-dimethoxy-1-methyl-2-[3-(3,4-dimethyl-phenyl)-propyl]-1,2,3,4-tetrahydro-isoquinoline hydrochloride having a melting point of 174°-176°.

EXAMPLE 17

A. Preparation of (+) 6,7-dimethoxy-1-methyl-2-[3-(3,4-dimethyl-phenyl)-3-keto-propyl]-1,2,3,4-tetrahydro-isoquinoline hydrochloride 6,7-Dimethoxy-1-methyl-1,2,3,4-tetrahydro-isoquinoline was resolved into its optical antipodes using d-tartaric acid and l-tartaric acid as described by SPATH and DENGEL in Ber., 1938, 71, 113.

A mixture containing 3.7 g. of 3,4-dimethyl-acetophenone, 1.5 g. of paraformaldehyde, 5.6 g. of (−) 6,7-dimethoxy-1-methyl-1,2,3,4-tetrahydro-isoquinoline hydrochloride, 30 ml. of ethanol and 0.3 ml. of concentrated hydrochloric acid was heated under reflux for 48 hours. The resulting mixture was cooled and ether was added thereto. The white solid which precipitated was recrystallized twice from ethanol to give 4.4 g. of (+) 6,7-dimethoxy-1-methyl-2-[3-(3,4-dimethyl-phenyl)-3-keto-propyl]- 1,2,3,4-tetrahydro-isoquinoline hydrochloride having a melting point of 171°–172°; $[\alpha]^{20°}_{365m\mu}$=+109.2°. (c=0.5 in ethanol).

B. Preparation of (+) 6,7-dimethoxy-1-methyl-2-[3-(3,4-dimethyl-phenyl)-propyl]-1,2,3,4-tetrahydro-isoquinoline hydrochloride 0.1 g. of 5 percent palladium-on-carbon and 0.1 ml. of concentrated hydrochloric acid were added to a solution containing 0.4 g. of (+) 6,7-dimethoxy-1-methyl-2-[3-(3,4-dimethyl-phenyl)-3-keto-propyl]-1,2,34-tetrahydro-isoquinoline hydrochloride in 15 ml. of ethanol and the resulting mixture was hydrogenated at room temperature until the calculated amount of hydrogen had been absorbed. The catalyst was subsequently removed by filtration and the filtrate was diluted with ether. The white crystals which precipitated were recrystallized from ethanol/ether to give 0.3 g. of (+) 6,7-dimethoxy-1-methyl-2-[3-(3,4-dimethyl-phenyl)-propyl]-1,2,3,4-tetrahydro-isoquinoline hydrochloride as a white solid having a melting point of 187°; $[\alpha]^{20°}_{365m\mu}$=+107° (c=0.5 in ethanol).

EXAMPLE 18

A. Preparation of (−) 6,7-dimethoxy-1-methyl-2-[3-(3,4-dimethyl-phenyl)-3-keto-propyl]- 1,,23,4-tetrahydro-isoquinoline hydrochloride 6,7-Dimethoxy-1-methyl-1,2,3,4-tetrahydro-isoquinoline was resolved into its optical antipodes using d-tartaric acid and l-tartaric acid as described by SPATH and DENGEL in Ber., 1938, 71, 113.

A mixture containing 3.3 g. of 3,4-dimethyl-acetophenone, 1.4 g. of paraformaldehyde, 5.0 g. of (+) 6,6-dimethoxy-1-methyl-1,2,3,4-tetrahydro-isoquinoline hydrochloride, 30 ml.

of ethanol and 0.3 ml. of concentrated hydrochloric acid was heated under reflux for 48 hours. The resulting mixture was cooled and ether was added thereto. The solid which precipitated was recrystallized twice from ethanol to give 3.7 g. of (−) 6,7-dimethoxy-1-methyl-2-[3-(3,4-dimethyl-phenyl)-3-keto-propyl]-1,2,3,4-tetrahydro-isoquinoline hydrochloride as white microcrystals having a melting point of 173°–174°; $[\alpha]_{365m\mu}^{20°} = -103°$ ($c=0.5$ in ethanol).

B. Preparation of (−) 6,7-dimethoxy-1-methyl-2-[3-(3,4-dimethyl-phenyl)-propyl]-1,2,3,4-dimethyl-phenyl)-propyl]-1,2,3,4-tetrahydro-isoquinoline hydrochloride 0.4 g. of (−) 6,7-dimethoxy-1-methyl-2-[3-(3,4-dimethyl-phenyl)-3-keto-propyl]-1,2,3,4-tetrahydro-isoquinoline hydrochloride were hydrogenated in the manner described in example 17B to yield 0.3 g. of (−) 6,7-dimethoxy-1-methyl-2-[3(3,4-dimethyl-phenyl)-propyl]-1,2,3,4-tetrahydro-isoquinoline hydrochloride having a melting point of 185°–186° (from ethanol/ether); $[\alpha]_{365m\mu}^{20°} = -109°$ ($c=0.5$ in ethanol).

EXAMPLE 19

Preparation of 6,7-dimethoxy-1-methyl-2-[3-(3,4-dimethyl-phenyl)-propyl]-1,2,3,4-tetrahydro-isoquinoline hydrochloride 0.1 ml. of 72 percent perchloric acid and a slurry containing 0.1 g. of palladium-on-carbon in 0.5 ml. of water were added to a solution containing 0.81 g. of 6,7-dimethoxy-1-methyl-2]3,4-dimethlyl-phenyl)-3-hydroxy-propyl]-1,2,3,4-tetrahydro-isoquinoline hydrochloride in 25 ml. of methanol. The mixture was hydrogenated at room temperature and atmospheric pressure until 0.002 mol of hydrogen had been absorbed. Hydrogen uptake then ceased. The catalyst was removed by filtration. The filtrate was diluted with water, made basic with dilute sodium hydroxide solution and extracted twice with ether. The combined extracts were washed with water and brine, dried over anhydrous sodium sulfate and evaporated under reduced pressure. The residual colorless oil was dissolved in ethanol and ethanolic hydrogen chloride was added to the solution. The solid which precipitated was recrystallized from isopropanol/ether to yield 0.7 g. of 6,7-dimethoxy-1-methyl-2-[3-(3,4-dimethyl-phenyl)propyl]-1,2,3,4-tetrahydro-isoquinoline hydrochloride as white prisms having a melting point of 170°.

EXAMPLE 20

A Preparation of 6,7-dimethoxy-1-methyl-2-]3-(4-methyl-phenyl)-3-keto-propyl]-1,2,3,4-tetrahydro-isoquinoline hydrochloride A mixture containing 13.4 g. of 4-methyl-acetophenone, 4.5 g. of paraformaldehyde, 24.4 g. of 6,7-dimethoxy-1-methyl-1,2,3,4-tetrahydro-isoquinoline hydrochloride and 70 ml. of ethanol was heated under reflux for 24 hours. The white crystalline precipitate which formed on cooling was removed by filtration and recrystallized from ethanol to yield 11.7 g. of 6,7-dimethoxy-1-methyl-2-[3-(4-methyl-phenyl)-3-keto-propyl]-1,2,3,41,2,3,4 -tetrahydro-isoquinoline hydrochloride as white prisms having a melting point of 192°–193°

B Preparation of 6,7-dimethoxy-1-methyl-2-]3-(4-methyl-phenyl)-propyl]-1,2,3,4-tetrahydro-isoquinoline hydrochloride 0.4 ml. of concentrated hydrochloric acid and 0.8 g. of 5 percent palladium-on-carbon were added to a solution containing 3.9 g. of 6,7-dimethoxy-1-methyl-2-[3-(4-methyl-phenyl)-3-keto-propyl]-1,2,3,4-tetrahydro-isoquinoline hydrochloride in 40 ml. of methanol. The mixture was hydrogenated at room temperature and atmospheric pressure until 0.02 mol of hydrogen had been absorbed. Hydrogen uptake then ceased. The catalyst was removed by filtration and the filtrate was evaporated to dryness. The residual white solid was recrystallized from isopropanol to yield 1.5 g. of 6,7-dimethoxy-1-methyl-2-[3-(4-methyl-phenyl)propyl]1,2,3,4-tetrahydro-isoquinoline hydrochloride as white prisms having a melting point of 187°–188°.

EXAMPLE 21

A. Preparation of trans 6,7-dimethoxy-1-methyl-2-[3phenyl-propen-(2)-yl]-1,2,3,4-tetrahydro-isoquinoline hydrochloride i. A solution containing 1.52 g. of trans cinnamyl chloride and 4.14 g. of 6,7-dimethoxy-1-methyl-1,2,3,4-tetrahydro-isoquinoline in 20 ml. of acetone was kept at 220° for 2 days. 1.3 g. of 6,7-dimethoxy-1-methyl-1,2,3,4-tetrahydro-isoquinoline hydrochloride were then removed by filtration and the filtrate was evaporated. The residual oil was suspended in sodium carbonate solution and the suspension was extracted with ether. The ether extract was dried over anhydrous sodium sulfate and evaporated. Treatment of the residual oil with ethanolic hydrogen chloride and ether followed by crystallization from ethanol/ether yielded 1.5 g. of trans 6,7-dimethoxy-1-methyl-2-[3-phenyl-propen-(2-yl]-1,2,3,4-tetrahydro-isoquinoline hydrochloride having a melting point of 214°–215°.

ii. A solution containing 4.9 g. of trans cinnamyl bromide, 5.2 g. of 6,7-dimethoxy-1-methyl-1,2,3,4-tetrahydro-isoquinoline and 2.5 g. of triethylamine in 25 ml. of acetone was kept at 20° for 2 days. The triethylamime hydrobromide was then removed by filtration and the filtrate was worked up in a manner analogous to that described in part A(i) of this example to yield 4.45 g. of trans 6,7-dimethoxy-1-methylQ2-[3-phenyl-propen-(2)-yl]-1,2,3,4-tetrahydro-isoquinoline hydrochloride having a melting point of 214°–215°.

B. Preparation of 6,71-methyl-2-(3-phenyl-propyl)-1,2,3,4-tetrahydro-isoquinoline hydrochloride A solution containing 1.2 g. of trans 6,7-dimethoxy-1-methyl-2-[3-phenyl-propen-(2)-yl]-1,2,3,4-tetrahydro-isoquinoline hydrochloride in 25 ml. of methanol was hydrogenated at room temperature and atmospheric pressure in the presence of 5 percent palladium-on-charcoal. After the rapid uptake of the theoretical amount of hydrogen, the catalyst was removed by filtration. The filtrate was worked up to yield, after recrystallization from isopropanol, 0.95 g. of 6,7-dimethoxy-1-methyl-2-(3-phenyl-propyl)-1,2,3,4-tetrahydro-isoquinoline hydrochloride as colorless plates having a melting point of 177°–179°.

EXAMPLE 22

A. Preparation of trans 6,7-dimethoxy-1-methyl-2-[3-(3,4-dimethyl-phenyl)-propen-(2)-yl]-1,2,3,4-tetrahydro-isoquinoline hydrochloride 61.1 g. of 1-bromo-3,4-dimethyl-benzene were slowly added dropwise at 20° to a suspension containing 8.9 g. of magnesium in 50 ml. of ether containing a crystal of iodine, a further 250 ml. of ether being added concomitantly with the 1-bromo-3,4-dimethyl-benzene once reaction had been initiated. The solution thus obtained was filtered and cooled to 0° 18.6 g. of freshly distilled acrolein were then added over a period of 0.5 hour and the resulting mixture was left overnight at 0°. Then, 15 ml. of saturated aqueous ammonium chloride solution were added and the resulting 1-(3,4-dimethyl-phenyl)-allyl alcohol, which was isolated and removed by distillation, had a boiling point of 110°–112°/0.8 mm.

13.1 g. of thionyl chloride were added dropwise over a period of 0.25 hour at 20° to a solution containing 17.7 g. of 1-(3,4-dimethyl-phenyl)-allyl alcohol in 120 ml. of ether. After 1 hour, the ether and excess thionyl chloride were removed by evaporation and the residual oil was taken up in ether. The ethereal solution was washed with sodium bicarbonate solution and distilled to yield 8.2 g. of trans 3,4-dimethyl-cinnamyl chloride having a boiling point of 76°/1 mm. which as used without further purification.

Seven g. of trans 3,4-dimethyl-cinnamyl chloride were added to a solution containing 16.1 g. of 6,7-dimethoxy-1-methyl-1,2,3,4 -tetrahydro-isoquinoline in 100 ml. of acetone and the mixture was kept at 20° for 2 days. Then, 6,7-dimethoxy-1-methyl-1,2,3,4 -tetrahydroisoquinoline hydrochloride was filtered off and the filtrate was evaporated. The residual oil was suspended in aqueous sodium bicarbonate solution and the suspension was extracted with ether. Treatment of the ether extract with ethanolic hydrogen chloride yielded trans 6,7-dimethyl-1-methyl-2-[3-(3,4-dimethyl-phenyl)-propen- 2-yl]1,2,3,4-tetrahydro-isoquinoline hydrochloride as an oil.

B. Preparation of 6,7-dimethoxy-1-methyl-2-[3(3,4-dimethyl-phenyl-propyl]-1,2,3,4-tetrahydro-isoquinoline hydrochloride A solution containing the trans 6,7-dimethoxy-1-methyl-2-[3-(3,4-dimethyl--phenyl)-propen-(2)yl]1,2,3,4-tetrahydro-isoquinoline hydrochloride obtained as described in part A of this example in 50 ml. of methanol was hydrogenated at atmospheric pressure in the presence of 0.1 g. of platinum oxide. The resulting mixture was worked up to yield, after crystallization from methanol/ether, 2.8 g. of 6,7-dimethoxy-1-methyl-2-[3-(3,4-dimethyl-phenyl)-propyl]-1,2,3,4-tetrahydro-isoquinoline hydrochloride as colorless needles having a melting point of 168°–170°.

EXAMPLE 23

A. Preparation of 6,7-dimethoxy-1-methyl-2-[3-(3,4-dimethyl-phenyl)-propen-(2)-yl]-1,2,3,4tetrahydro-isoquinoline hydrochloride A Grignard solution was prepared under the usual conditions from 24 g. of ethyl bromide and 5.84 g. of magnesium in 50 ml. of dry ether. Twenty-six g. of 1-(3,4-dimethyl-phenyl)-acetylene were then added at 0° and the resulting solution was maintained at 20° for 2 hours. The solution was then treated at 0° with vigorous stirring with formaldehyde gas obtained by heating 18 g. of paraformaldehyde at 200°. After completion of the reaction, ammonium chloride solution was added and the reaction product was taken up in ether. The ethereal solution was dried and distilled to yield 19.7 g. of 3-(3,4-dimethyl-phenyl)-propargyl alcohol of boiling point 125°–130°/0.8 mm.; $n_D^{20}$=b 1.5792.

A solution of 16 g. of 3-(3,4-dimethyl-phenyl)-propargyl alcohol in 16 ml. of ether and 2 ml. of pyridine was treated at 0° over a period of 0.25 hour with 10.82 g. of phosphorus tribromide. The resulting mixture was heated at reflux for 3 hours, then poured on to ice and extracted with ether. The ether extract was washed with sodium carbonate solution, dried and evaporated. The residual oil was distilled to yield 17.4 g. of pure 3-(3,4-dimethyl-phenyl)-propargyl bromide having a boiling point of 106°–112°/0.1 mm; $n_D^{20}$=1.608.

A solution containing 33.45 g. of 3(3,4-dimethyl-phenyl)-propargyl bromide, 31.05 g. of 6,7-dimethoxy-1-methyl-1,2,3,4-tetrahydro-isoquinoline and 15.15 g. of triethylamine in 300 ml. of acetone was kept at 20° for 1 day. Precipitated triethyl-amine hydrobromide was then removed by filtration. The filtrate was concentrated, treated with sodium bicarbonate solution and extracted with ether. Treatment of the base thus obtained with ethanolic hydrochloric acid yielded 23.5 g. of 6,7-dimethoxy-1-methyl-2-[3-(3,4-dimethyl-phenyl)-propyn-(2)-yl]-1,2,3,4-tetrahydro-isoquinoline hydrochloride having a melting point of 175°–177° after recrystallization from ethanol/ether.

6,7-Dimethoxy-1-methyl-2-[3-(3,4-dimethyl-phenyl)-propyn-(2)-yl]-1,2,3,4-tetrohydro-isoluinoline was also obtained from 3-(3,4-dimethyl-phenyl)- bromide and 6,7-dimethoxy-1-methyl-1,2,3,4-tetrohydro-isoluinoline as follows:

A solution containing 11.15 g. of 3-(3,4-dimethyl-phenyl)-propargyl bromide and 20.7 g. of 6,7-dimethoxy-1-methyl-1,2,3,4-tetrohydro-isoluinoline in acetone was kept at 20°. 6,7-Dimethoxy-1-methyl-1,2,3,4-tetrohydro-isoquinoline hydrobromide was then removed by filtration and the filtrate was worked up to yield 8.8 g. of 6,7-dimethoxy-1-methyl-2-[3-(3,4-dimethyl-phenyl)-propyn-(2)-yl]-1,2,3,4-tetrahydro-isoquinoline hydrochloride having a melting point of 175°–177°.

B. Preparation of 6,7-dimethoxy-1-methyl-2-[3-(3,4-dimethyl-phenyl)-propyl]-1,2,3,4-tetrahydro-isoquinoline hydrochloride 1.0 g. of 6,7-dimethoxy-1-methyl-2-[3-(3,4-dimethyl-phenyl)-propyn-(2)-yl]-1,2,3,4-tetrahydro-isoquinoline hydrochloride was dissolved in methanol and hydrogenated at 20° and atmospheric pressure in the presence of platinum oxide. After the uptake of 192 ml. of hydrogen, the catalyst was removed by filtration. The filtrate was worked up to yield, after crystallization from isopropanol, 0.5 g. of 6,7-dimethoxy-1-methyl-2-[3-(3,4-dimethyl-phenyl)-propyl]-1,2,3,4-tetrahydro-isoquinoline hydrochloride having a melting point of 164°–166°.

EXAMPLE 24

A. Preparation of cis 6,7-dimethoxy-1-methyl-2-[3-(3,4-dimethyl-phenyl)-propen-(2)-yl]1,2,3,4-tetrahydro-isoluinoline sesquioxalate 7.7 g. of 6,7-dimethoxy-1-methyl-2-[3-(3,4-dimethyl-phenyl)-propyn-(2)-yl]-1,2,3,4-tetrahydro-isoluinoline hydrochloride, prepared as described in example 23A, were converted into the corresponding free base. The free base was hydrogenated in methanolic solution in the presence of 0.5 g. of Lindlar catalyst (lead poisoned 5 percent palladium-on-calcium carbonate) and 5 ml. of a 5 percent methanolic solution of quinoline at 20° and atmospheric pressure for 1 hour (hydrogen uptake=480 ml.). The catalyst was then removed by filtration. The filtrate was concentrated and treated with oxalic acid. The resulting oxalate crystallized from ethanol to yield 4.45 g. of cis 6,7-dimethyl-1-methyl-2-[3-(3,4-dimethyl-phenyl)-propen-(2)-yl]1,2,3,4-tetrahydro-isoluinoline susquioxalate as colorless needles, which after recrystallization from ethanol/ether, had a melting point of 156°–159°

B. Preparation of 6,7-dimethoxy-1-methyl-2-[3-(3,4,-dimethyl-phenyl)-propyl]-1,2,3,4 -tetrahydro-isoquinoline A solution containing 0.9 g of cis 6,7-dimethoxy-1-methyl-2-[3,4-dimethyl-phenyl)-propen-(2)-yl]-1,2,3,4-tetrahydro-isoquinoline sesquioxalate in 20 ml of methanol was hydrogenated at room temperature and pressure in the presence of 0.1 g. of platinum oxide catalyst. After the rapid uptake of 71 ml. of hydrogen, the catalyst was removed by filtration. The filtrate was concentrated, treated with 2-N sodium hydroxide solution and extracted with benzene. The benzene extract was chromatographed on a column of alumina and the eluates containing 6,7-dimethoxy-1-methyl-2-[3-(3,4-dimethyl-phenyl)-propyl]1,2,3,4-tetrahydro-isoquinoline were combined and converted into the corresponding hydrochloride. Crystallization gave 0.2 g of 6,7dimethoxy-1-methyl-2-[3-(3,4-dimethyl-phenyl)-propyl]-1,2,3,4-tetrahydro-isoquinoline hydrochloride as colorless needles having a melting point of 172°–174°

The following examples illustrate the manner in which pharmaceutical preparations containing the derivatives provided by the invention may be obtained:

EXAMPLE A

Tablets each containing 25 mg. of 6,7-dimethoxy-1-methyl-2-(3-phenyl-propyl)-1,2,3,4-tetrahydro-isoquinoline hydrochloride, 98 mg. of lactose, 40 mg. of corn starch, 10 mg. of prehydrolyzed corn starch and 2 mg. of calcium stearate and each having a total weight of 175 mg. were prepared by blending the active ingredient, lactose, corn starch and prehydrolyzed corn starch in a suitable mixer, moistening the resulting mixture with water so as to form a heavy paste, passing the paste through a screen, drying the resulting granulate at 45° for about 16 hours, adding the calcium stearate, blending the mixture until the calcium stearate was uniformly dispersed therein, and compressing the mixture thus obtained into tablets having a diameter of 8 mm. The tablets may be scored, if desired.

EXAMPLE B

Capsules each containing 25 mg. of 6,7-dimethoxy-1-methyl-2-c3-phenyl-propyl)-1,2,3,4-tetrahydro-isoquinoline hydrochloride, 155 mg. of lactose, 30 mg. of corn starch and 5 mg. of talc and each having a total weight of 215 mg. were prepared by thoroughly blending the active ingredient, the lactose, the corn starch and the talc and filling the resulting powder into suitable two-piece hard shell gelatin capsules on a capsulating machine.

EXAMPLE C

Tablets each containing 25 mg. of 6,7-dimethoxy-1-methyl-2-[3-(3,4-dimethyl-phenyl)-propyl]-1,2,3,4-tetrahydro-isoquinoline hydrochloride, 98 mg. of lactose, 40 mg. of corn starch, 10 mg. of prehydrolyzed corn starch and 2 mg. of calcium stearate and each having a total weight of 175 mg. were prepared by blending the active ingredient, lactose, corn starch and prehydrolyzed corn starch in a suitable mixer, moistening the resulting mixture with water so as to form a heavy paste, passing the paste through a screen, drying the resulting granulate at 45° for about 16 hours, adding the calcium stearate, blending the mixture until the calcium stearate was uniformly dispersed therein, and compressing the mixture thus obtained into tablets having a diameter of 8 mm. The tablets may be scored, if desired.

EXAMPLE D

Capsules each containing 25 mg. of 6,7-dimethyl-1-methyl-2-[3-(3,4-dimethyl-phenyl)-propyl]-1,2,3,4-tetrahydro-isoquinoline hydrochloride, 155 mg. of lactose, 30 mg. of corn starch and 5 mg. of talc and each having a total weight of 215 mg. were prepared by thoroughly blending the active ingredient, the lactose, the corn starch and the talc and filling the resulting powder into suitable two-piece hard shell gelatin capsules.

We claim:
1. A compound of the formula

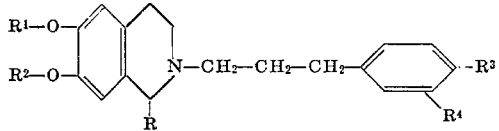

wherein R is hydrogen or lower alkyl; $R^1$ and $R^2$, individually, are lower alkyl and taken together are methylene; and $R^3$ and $R^4$ taken together are trimethylene, tetramethylene or butadien-(1,3)-ylene-(1,4) and pharmaceutically acceptable acid addition salts thereof.

2. A compound in accordance with claim 1 wherein R is hydrogen.
3. A compound in accordance with claim 1 wherein R is lower alkyl.
4. A compound in accordance with claim 3 wherein R is methyl or ethyl.
5. A compound in accordance with claim 4 wherein R is methyl.
6. A compound in accordance with claim 5 wherein $R^1$ and $R^2$ are lower alkyl.
7. A compound in accordance with claim 5 wherein $R^1$ and $R^2$ are methylene.
8. A compound in accordance with claim 6 wherein $R^1$ and $R^2$ are methyl.
9. 6,7-dimethoxy-1-methyl-2-{3-[naphythyl-(2)]-propyl}-1,2,3,4-tetrahydroisoquinoline.
10. 6,7-dimethoxy-1-methyl-2-{3[indanyl-(5-propyl]-1,2,3,4-tetrahydroisoquinoline.
11. A compound of the formula

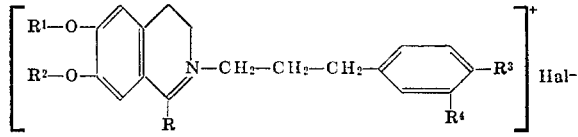

wherein R is hydrogen or lower alkyl; $R^1$ and $R^2$, individually, are lower alkyl and taken together are methylene; $R^3$ and $R^4$ taken together are trimethylene, tetramethylene or butadien-(1,3)-ylene-(1,4); and Hal is a halogen anion.

12. A compound of the formula

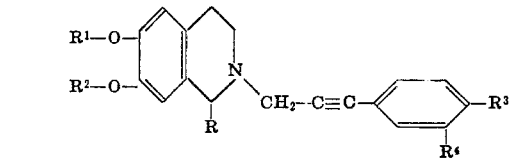

wherein R is hydrogen or lower alkyl; $R^1$ and $R^2$, individually, are lower alkyl and taken together are methylene; and $R^3$ and $R^4$ taken together are trimethylene, tetramethylene or butadien-(1,3)-ylene-(1,4) and addition salts thereof.